(12) United States Patent
Clark et al.

(10) Patent No.: US 6,918,088 B2
(45) Date of Patent: Jul. 12, 2005

(54) SERVICE PORTAL WITH APPLICATION FRAMEWORK FOR FACILITATING APPLICATION AND FEATURE DEVELOPMENT

(75) Inventors: Michael S. Clark, Superior, CO (US); Philip E. Braum, Golden, CO (US); Larry W. Davis, Littleton, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 732 days.

(21) Appl. No.: 10/007,044

(22) Filed: Nov. 5, 2001

(65) Prior Publication Data

US 2003/0088617 A1 May 8, 2003

(51) Int. Cl.[7] .............................................. G06F 17/00
(52) U.S. Cl. ...................... 715/742; 715/748; 715/826; 719/328; 719/329; 709/250; 709/246
(58) Field of Search ................................. 709/230, 228, 709/238, 250, 246; 707/501; 713/201; 715/742, 748, 826; 719/328, 329

(56) References Cited

U.S. PATENT DOCUMENTS

| 6,064,368 A | 5/2000 | Graba |
| 6,104,395 A | 8/2000 | Alimpich et al. |
| 6,108,686 A | 8/2000 | Williams, Jr. |
| 6,199,077 B1 | 3/2001 | Inala et al. |
| 6,226,654 B1 | 5/2001 | Van Hoff |
| 6,247,020 B1 | 6/2001 | Minard |
| 6,266,059 B1 | 7/2001 | Matthews, III et al. |
| 6,412,073 B1 * | 6/2002 | Rangan ....................... 713/202 |
| 6,594,766 B2 * | 7/2003 | Rangan et al. .............. 713/202 |
| 6,763,388 B1 * | 7/2004 | Tsimelzon .................. 709/228 |
| 6,834,306 B1 * | 12/2004 | Tsimelzon .................. 709/228 |
| 2001/0000537 A1 * | 4/2001 | Inala et al. ................. 707/500 |
| 2001/0023414 A1 * | 9/2001 | Kumar et al. ................. 705/35 |

* cited by examiner

Primary Examiner—Krisna Lim
(74) Attorney, Agent, or Firm—Kent A. Lembke; William J. Kubida; Hogan & Hartson LLP

(57) ABSTRACT

A computer system for controlling access to an application used to provide a service to users in a network and to facilitate feature development in the application. The system includes a service application including features or feature mechanisms for providing service functions. The feature mechanisms each include a model interface portion, a view portion, and a controller portion to separate access to business model properties and data from content presentation. Memory stores application-specific data and lists of the feature mechanisms of the application. The system further includes a portal framework that receives user requests from client devices and for transmitting responses. The framework processes the request to determine which feature mechanism is being requested, routes the user request to appropriate feature mechanism, and builds a response with a content page from the view portion and a reusable portion built by the framework.

20 Claims, 3 Drawing Sheets

SERVICE PORTAL WITH APPLICATION FRAMEWORK FOR FACILITATING APPLICATION AND FEATURE DEVELOPMENT

BACKGROUND OF THE INVENTION

1. Field of the Invention

The present invention relates, in general, to providing, servicing, and developing software applications, such as web-based applications including websites and corresponding services, in a distributed computer network, and, more particularly, to a service portal system that implements an application framework to control user access to application features or functions, allow features to be developed, updated, and readily plugged in to the application, and provide consistent presentation of feature content.

2. Relevant Background

Recently, it has become critical for many businesses to deliver networked applications and services to clients using wired or wireless devices typically linked to the Internet or other data communications network. Often, a server, such as a web server, is used by businesses and others to run an application, such as a website, to provide a service to its customers or clients. The service is generally made up of a number of features or functions that can be used or navigated by a client through a menu or otherwise. For example, the client or user can use a browser and Internet connection to access the application, manipulate data, and view content provided by the application features. Web-based applications allow a user to use their browser to quickly and remotely access secure business logic, such as e-commerce shopping cart systems, financial planning systems, insurance or mortgage quote systems, and the like.

To control access to the application and its features, a portal or service portal is often implemented to act as a point of entry to one or more applications and features of the applications. The service portal may be thought of as including both the hardware infrastructure, such as an application or web server, and a software framework necessary to implement functions including a user interface, serving content, managing data, and providing security (e.g., authenticating or logging in users).

While providing a useful mechanism for controlling and operating a networked application, existing service portals fail to meet the needs of e-commerce businesses. Specifically, existing service portal designs do not satisfactorily support application development. Generally, the underlying application architecture is fragmented and not built to any specific industry standards. This makes it very difficult for a developer to modify an existing feature or to add a new feature for an application without being forced to modify other portions of the application and/or service portal. Often, existing service portals are configured with the business model, such as a session-based shopping cart, of the application being tightly linked with presentation of content. Changes to the business model have to be performed with a full understanding of how the service portal or other mechanisms handle presenting data.

With developers being located in many geographic locations, successful coordination of developing new application features and implementing changes to application content is difficult to achieve. Troubleshooting and debugging of the service portal and applications it services presently requires integral knowledge of the entire system which is difficult when engineers may be responsible for coding while designers and others with less technical expertise may be responsible for maintaining a system. Presently, application servers are marketed by software companies as solving the problems involved with providing a web application but typically these application servers merely provide a platform for running applications not for building applications. Software or web engineers usually have to create (e.g., reinvent) a lot of code to provide an effective service with an application.

Hence, there remains a need for a tool for building web or network-based applications and, more specifically, for an improved apparatus (such as a service portal) and method of controlling access to applications and their features in a network setting that facilitates development of the applications and building or modifying application features. Preferably, such an apparatus and method would be created based on accepted industry standards for architectural and application design to facilitate modification of selected portions of the service provided by the application, such as modifying a method presenting content, changing a business model, altering content, or modifying a feature, without intimate knowledge of other portions of the system.

SUMMARY OF THE INVENTION

The present invention addresses the above discussed and additional problems by providing a service portal system in which a portal framework is provided for each service application to provide a single entry and exit point for the application. The portal framework is configured to create an enhanced user interface for the service applications and to support development of features for the applications. Generally, the portal framework includes a master controller acting as the entry point for all application requests and performing routing of the requests to appropriate features, e.g., to feature controllers. The master controller performs other optional functions including checking for a required log in, reacting to exceptions, and the like. Each feature of the application separates the business model from its presentation.

To this end, the master controller instantiates or creates a feature controller and a feature model interface and determines an appropriate feature content page to receive a user request. The portal framework includes a presentation container to create a consistent look and feel for presenting or displaying the feature content page in a response. For example, but not as a limitation, this may include integrating a header, a menu, and a footer with the feature content page to build the response. The separation of access to data and of functionality within each feature facilitates separately modifying or developing features, which then operate under the direction of the portal framework to provide controlled access to the application and responses with consistent (but easily modified) content and configuration.

More particularly, a computer system is provided for controlling access to an application used to provide a service to users in a network and to facilitate feature development in the application. The system includes a service application including features or feature mechanisms for providing service functions. The feature mechanisms each include a model interface portion, a view portion, and a controller portion to separate access to business model properties and data from the method of presenting content. Memory, such as a database and a cache, is included for storing application-specific data and lists of the feature mechanisms of the application. The system further includes a portal framework that receives user requests from client devices and for transmitting responses (e.g., providing a single access or portal to the application). The portal framework is adapted to process the user request to determine which feature mechanism is being requested, for routing the user request to appropriate feature mechanism, and for building a response with an application content page built by the view portion and a "wraparound" portion built for the application by the portal framework.

DETAILED DESCRIPTION OF THE PREFERRED EMBODIMENTS

The present invention provides a portal method and system with unique portals or portal frameworks for controlling access to and operation of a service, such as a web site, web-based application, or other application provided on a server or other computing device. The portal method and system of the present invention is configured to provide an entry point for all service requests and an exit point for service responses. The portal method and system in some embodiments acts to perform security and login functions. The portal system and method then routes the request and other retrieved data to an appropriate feature or feature mechanism, which provides the requested service (or a portion of the requested service) and develops feature content. A response is then created using the portal method and system to wrap a standard presentation (e.g., a consistent look and feel) around the unique feature content. The portal method and system is designed according to industry-wide standards, such as Model 2 JSP (Java Server Pages) and the Model View Controller (MVC) design standard for feature mechanisms that are adapted to separate the business model or rules from the presentation of content.

The portal system and method includes features that assist application and feature developers by providing a non-intrusive portal that makes it easy to develop and plug in new features and applications. The portal system is readily adaptable to numerous application and computing environments. The portal system is service-oriented in that it can be used to provide (or provide access to) a plurality of services for developers to utilize or call on (e.g., authentication services, authorization services, and the like) without having to reinvent underlying code. Development time and cost is reduced because a developer is not required to understand every feature of the portal system but instead can simply modify a feature mechanisms or even portions of such mechanisms and then plug in the modified portion to the portal system (e.g., the portal framework that will be discussed in detail below).

To fully describe the elements of the invention that provide these unique functions, a networked system utilizing service portal concepts of the present invention is presented. The system level explanation is followed with a more detailed description of operation of and data flow between the devices or mechanisms (such as software frameworks, objects, portions of code, and the like) that are used to implement the service portal concepts. Next, a detailed discussion of operation of the portal system and data flow within the system is provided to further teach how the invention is able to provide users with access to services and consistent presentation of content while allowing developers the freedom to modify portions of the application or feature providing the service.

Figure 1:
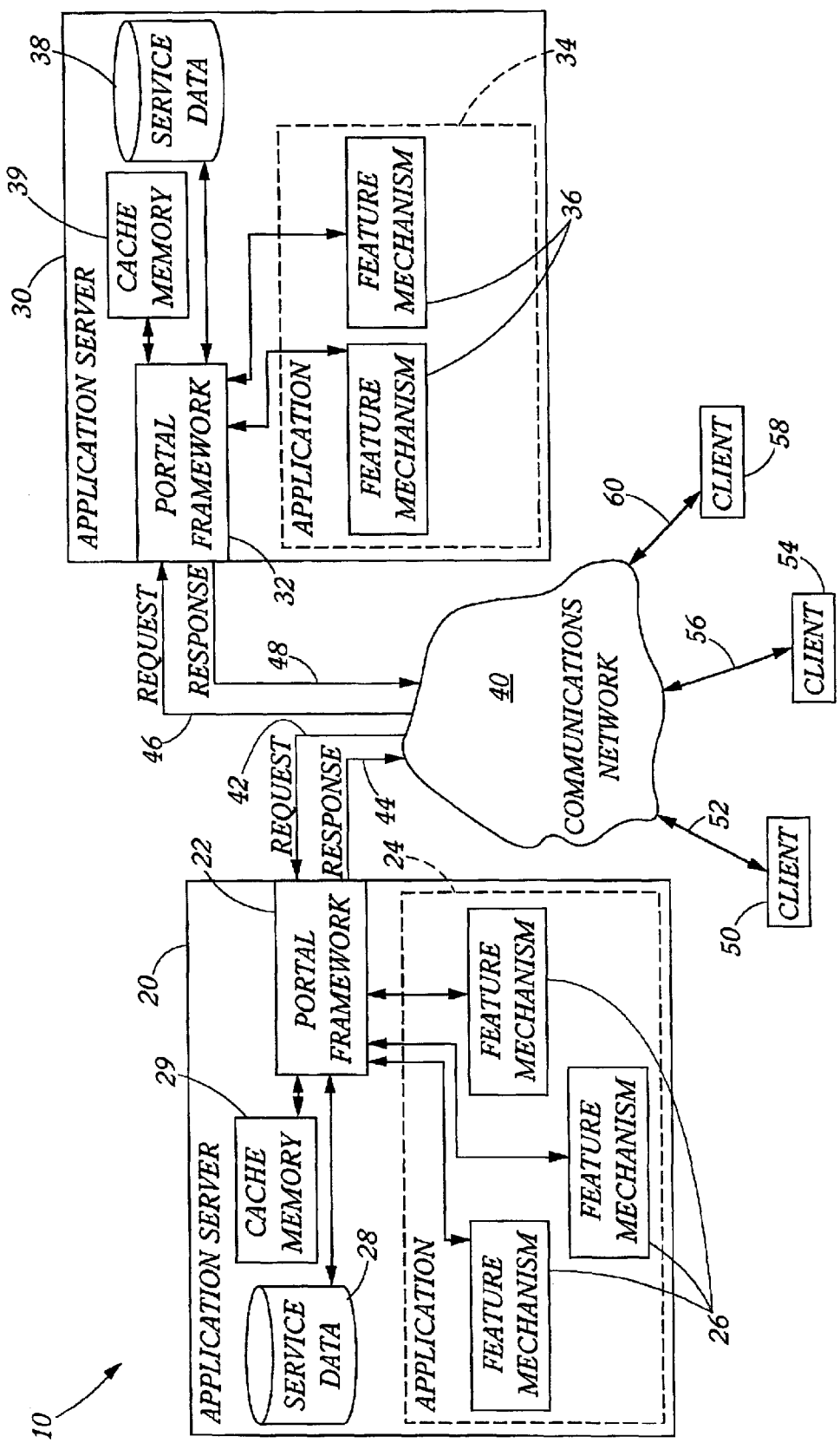
FIG. 1 illustrates in block form a service portal system with a number of application servers controlling user access and application responses to users or client devices using a portal framework according to the present invention.

FIG. 1 illustrates one embodiment of a service portal system 10 useful for controlling user access to services, for providing a consistent presentation of business content to the users, and, importantly, for allowing features to be developed and maintained with minimal or no affect on other portions of the system. The illustrated service portal system 10 includes two application servers 20 and 30 to provide two or more services to a number of clients 50, 54, and 58. The client devices may be nearly any electronic device useful for wired or wireless communication with the application servers 20, 30 such as personal computing devices or systems with a browser and network connection (e.g., a modem). For illustration purposes, the services provided within the system 10 may be operating websites that provide the clients 50, 54, 58 with secure access to business web-based services, i.e., a business model.

The functions and operation of the components in the service portal system 10 are described in a client/server, de-centralized computer network environment. While this is a highly useful implementation of the invention, those skilled in the computer and networking arts will readily appreciate that the system 10 and its functions are transferable to many data communication systems that utilize numerous and varied data transfer techniques. These variations to the exemplary service portal system 10 are considered within the breadth of the following disclosure and claims.

As illustrated, the service portal system 10 includes the application servers 20, 30 configured for providing services to clients 50, 54, 58 via the communications network 40. The application servers 20, 30 may be standard web servers or other devices useful for running applications and storing data. In the following discussion, network devices, such as application servers 20, 30 and client devices 50, 54, 58, will be described in relation to their function rather than as particular electronic devices and computer architectures. To practice the invention, the computer devices and network devices may be any devices useful for providing the described functions, including well-known data processing and communication devices and systems such as personal computers with processing, memory, and input/output components. Many of the network devices may be server devices configured to maintain and then distribute software applications over a data communications network. The communication links, such as links used to communicate the user requests 42, 46 and responses 44, 48 and the links 52, 56, 60, may be any suitable data communication link, wired or wireless, for transferring digital data between two electronic devices and the communications network 40 may also be a number of standard networks such as a LAN, a WAN, an Intranet, the Internet, and the like. In a preferred embodiment, the service portal system 10 is adapted to be protocol free with data being communicated in any of a number of digital formats following standard protocols, such as TCP/IP, but this is not a limitation of the invention as data may even be transferred on storage mediums between the devices or in print out form for later manual or electronic entry on a particular device.

During operation of the system 10, the clients 50, 54, 58 submit service requests 42, 46 to the application servers 20, 30 that indicate the service requested, data indicating a particular service page and/or particular service feature, user information (such as login information, security information, and the like), and other information required for obtaining the service. Significantly, the application servers 20, 30, e.g., a web server, include portal frameworks 22, 32 that are configured to act as a single entry point at the application servers 20, 30 to the provided service. As will be discussed more thoroughly as part of system operation, the portal frameworks 22, 32 may be software frameworks, running code, and/or objects that operate to receive the requests 42, 46, perform initial processing of the requests to determine a destination for routing, perform security and/or login procedures (in some embodiments security and login procedures are not provided and this may be considered another service that can be plugged into the portal framework 22, 32 but not required for practicing the invention), route the request, control presentation of responses, and transmit the responses 44, 48 back to the requesting client 40, 54, 58 via the network 40 and links 52, 56, 60.

The clients 50, 54, 58 may be client networks or end user devices (e.g., end user servers, computer workstations, personal computers, and the like). Two application servers 20, 30 and three clients 50, 54, 58 are shown for illustrative purposes, but the system 10 in practice typically would include many servers 20, 30 providing a variety of services and thousands of clients 50, 56, 58 accessing such services (e.g., users of the Internet).

The portal framework 22, 32 may comprise a software program or one or more application modules installed on a computer system or device which may be maintained as part of the application server 20, 30 (or in some cases, on a separate device). Typically, the portal framework 22, 32 is a structural frame of software that provides a user interface or API. In addition to the portal framework 22, 32, the application server 20, 30 includes an application 24, 34, such as a web-based or other application, that is run on the server 20, 30 to provide a service. In general, the application is based on a business model, such as a shopping service, an information service, an education service, and the like, that is made up of a number of features or functions. These features are provided by the feature mechanisms 26, 36. In a website embodiment, the features may be functions of the website service that can be navigated by the client device 50, 54, 58 via a menu (which may be part of the presentation provided by the portal framework 22, 32 and/or a separate feature). In this embodiment, the applications 24, 34 are web applications with request and response interactions with the clients 50, 54, 58 controlled by the portal frameworks 22, 32.

The system 10 further includes data storage for use in storing information useful for controlling access to the applications 24, 34 (e.g., providing a consistent interface to the underlying service), for running the service provided by the applications 24, 34, and for providing consistent presentation in the responses 44, 48 provided by the portal frameworks 22, 32. The data, such as user and service metadata, may be stored in databases within the servers 20, 30 such as the illustrated service data databases 28, 38, or in other devices in different forms. Although not required, cache memory 29, 39 is typically provided to facilitate storage and quick retrieval of data frequently used by the portal framework 22, 32 during operation of the service portal system 10. For example, at start up of the applications 24, 32 the portal framework 22, 32 can operate to cache application-specific (e.g., website-specific) data including attributes, menus, feature helper routines or objects, localization information (e.g., geographic, language, and other location or user specific information), and the like. Importantly, a listing of the feature mechanisms 26, 36 of the applications 24, 34 for use in routing requests 42, 46 is typically also cached in cache memory 29, 39. As illustrated, the portal framework 22, 32 is linked or otherwise has access to the service data 28, 38 and the cache memory 29, 39.

The service portal system 10 is configured to facilitate development of applications 24, 34, and features (e.g., functions provided by the feature mechanisms). The system 10 in this regard is adapted to allow a developer to alter an application 24, 34 and/or feature mechanism 26, 36 without extensive knowledge of the portal framework 22, 32 and even without knowledge of the other feature mechanisms 26, 36. This is achieved in part by separating control over the presentation or view of content from the content itself. In this regard, one embodiment of the system 10 is created to meet Model View Controller (MVC) design standards or patterns to facilitate such "plug and play" development of the services provided via each application servers 20, 30.

In the MVC design of the present invention, three objects or modules are used to decouple or separate the objects. A "model" is provided that represents the business application or interface to the business application. The model holds data relevant to the business or other process and performs processing of that data but knows nothing of the other two objects. A model interface is provided to act as a proxy for the model or data model, such as with a translator pattern and/or a value object pattern. The "view" is used to display data contained in the model such as a screen presentation. The "controller" typically defines the way a user interface reacts to user input and may be thought of as the glue between the model and the view. The MVC pattern is useful in the system 10 because it facilitates dependency management between the components providing the service, provides flexibility by allowing separate modification of the features, models, and views, furthers reuse of features and functions (and the underlying code, classes, objects, and the like), and allows team development efforts (e.g., different team members can work on different features, functions, and components separately and even geographically remotely).

Figure 2:
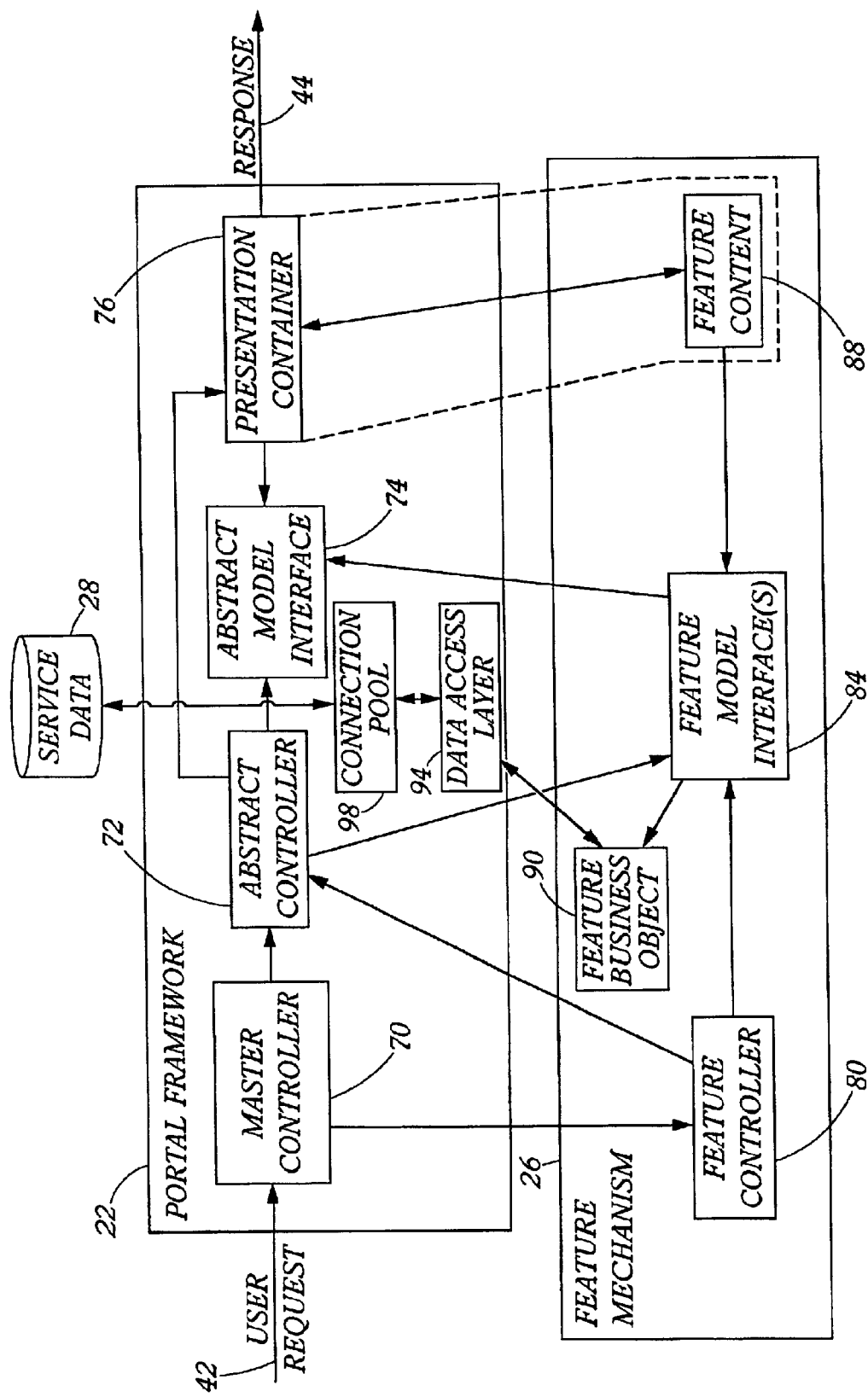
FIG. 2 is a block diagram of an exemplary portal framework and feature mechanism of FIG. 1 illustrating the elements of the portal framework that enables data control and content display to users while facilitating application and feature developers ability to develop new applications and features that can readily be plugged into the application without modifying the portal framework.

To explain how the system 10, and specifically the portal framework 22, 32, incorporates the MVC design paradigm, FIG. 2 illustrates in functional block form the data flow and/or operating links between a single portal framework 22 and a feature mechanism 26. This pattern of data flow and control would be repeated between each framework 22, 32 and feature mechanism 26, 36 in the service portal system 10. As discussed earlier, the portal framework 22 acts as an entry and exit point for the application 24 and as such receives the user request 42 and transmits the response 44. Typically, the user request 42 and response 44 will be browser requests (e.g., HTTP formatted data strings) from one of the clients 50, 54, 58.

To provide this entry and exit point, the portal framework 22 includes a master controller 70 or master controller that processes the user request 42 and provides initial routing by determining the appropriate feature mechanism 26 from the user request 42 information. In operation, the master controller 70 acts to instantiate the appropriate feature controller 80 and route the request 42 to the feature controller 80 of the feature mechanism 26. The master controller 70 further acts to access the service data 28 (link not shown in FIG. 2) for service properties and other information and store service information in the cache memory 29. The master controller 70 may in some embodiments provide a number of functions (or services) for each feature mechanism 26 including, for example, authentication and user management and exception handling. The master controller 70 further acts to initialize the abstract controller 72 of the framework 22 and to set properties of the abstract controller 72. The master controller 70 obtains a page name parameter that is used to determine which feature content 88 should receive the user request 42 information.

The feature controller 80 of the feature mechanism 26 can be thought of as an implementation of the abstract controller 72 (extending the class in the Java™ environment) that is specific to the feature mechanism 26 and the function it provides. The feature controller 80 manages the flow of data between the feature content 88 and works in conjunction with the feature model interface 84 to manage the state of the feature mechanism 26. Typically, the feature controller 80 sets the properties of the feature model interface 84.

The abstract controller 72 is configured for creating and initializing the feature model interface 84 (or interfaces in some embodiments). The abstract controller 72 further acts to set the properties of the abstract model interface 74 and to establish a reference to the abstract model interface 74 as a service session attribute or a service request attribute. The abstract controller 72 functions to control inter-feature navigation (e.g., request routing within the feature mechanism 26) as needed and routes the request to the appropriate presentation container 76 (or back to the master controller 70).

The abstract model interface 74 acts as an interface between the feature mechanism 26 and the portal framework 22 as well as services or functions provided by the portal framework 22 components or other mechanisms on the application server 20. At a high level, the interface 74 provides a data hierarchy abstraction for the business object model translation layer (e.g., feature business object(s) 90) and acts as the network abstraction layer for the portal framework 22. During operation of application server 20 to provide the service feature, the interface 74 functions to provide access to properties (e.g., website properties) and other service or data and to user profiles/information. This information may be stored in the service data 28 (link not shown in FIG. 2) and/or in cache memory 29 (or on other storage devices not shown). For example, in one embodiment due to the services being provided by the application 24, the abstract model interface 74 is adapted to provide methods for creating and synchronizing menus with the current feature content 88.

The abstract model interface 74 in some embodiments acts as the interface to services provided by the portal framework 22 or by separate mechanisms (not shown). For example, the portal framework 22 may provide services useful in providing security or for making information useful or particular to the geographic location of the application server 20. In this case, the interface 74 acts as an interface to an authorization service and to a localization service. Other services may be provided to the application 24 and its features by the portal framework 22, such as providing a menu service. The number and type of services provided by the portal framework 22 may vary widely and be adapted to suit the needs of the application 24 or the application server 20. The portal framework 22 may not provide any of these optional services but act as an access and exit point to application 24 and control consistency of the look and feel of presentation of feature content 88 (with these portal framework services being themselves removable and pluggable for ease of maintenance and flexibility in creating desired applications and features). Significantly, though, the abstract model interface 74 provides a single, reusable interface to any services by the portal framework 22 for the feature mechanisms 26 of the application 24, which greatly simplifies the development of feature mechanisms 26 and application 24.

The feature model interface(s) 84 is an important aspect of the invention and provides a number of unique elements of the invention. The feature model interface 84 is a concrete implementation of the abstract model interface 74 that is created to be specific to the feature content 88 (e.g., a content page) provided by the feature mechanism 26. The feature model interface 84 functions to create an interface into particular business processes or business object models 90 for the feature content 88 (i.e., the view portion of the MVC design pattern). In other words, the interface 84 acts as a proxy to the feature business object(s) 90 to provide a single point of contact to the feature business object(s) 90 for feature controller 80 and feature content 88.

The feature business object(s) 90 is a business model (e.g., the model of the MVC design) or pure objects in an object-oriented environment used to hold data and provide desired business rules or behavior and states of corresponding objects. The feature business object(s) 90 can be separately altered and changed to suit goals of a business or other entity without affecting operation of the other components of the feature mechanism 26 or the portal framework 22. As one simplified business model, the feature business object(s) 90 is a hierarchy of business entities that includes a collection of customers (e.g., providing desired behaviors of objects) that contains a multitude of customers (e.g., providing customer information/profiles) that each contain a number of orders that further contain a number of line items. The specific business model provided by the feature business object 90 is not as important as the idea of providing a single access to the feature business object 90 with the feature model interface 84.

The feature model interface 84 further acts as an interface with a data access layer or mechanism 94 provided in the portal framework 22. The data access layer 94 (which may be helper objects in an object-oriented environment) acts to populate or inflate objects or models from the feature business object 90 by providing a method of accessing the service data 28. The data access layer 94 manages obtaining connections from a connection pool 98 to the service data 28 and cleaning up connections after data is retrieved. The connection pool 98 is an efficiency tool that typically has a set or number (e.g., a pool) of connections to the service data 28 and other databases (not shown) which it assigns or provides to the data access layer 94 upon request, thereby providing a consistent and efficient method of accessing the service data 28 (e.g., by, in some embodiments, acting as a facade pattern and/or translator pattern between the data access layer 94 and the service data 28).

The feature content 88 is the presentation of the now populated business model 90 and as such, the feature content 88 obtains its properties from its interface with the business model 90 and its interface with service data 28, i.e., the feature model interface 84. The feature content 88 then contains properties that describe the page or view for a feature mechanism 26 and locations for objects or modules needed to build the page or view. During operation, the portal framework 22 operates to determine which of the pages or views described by the feature content 88 to load based on these locations. The feature content 88 in a website application 24 is the screen presentation provided to the client 50, 54, 58 via the response 44.

The view or screen presentation may be provided in a number of ways. For example, to facilitate feature development, a Model 2 JSP standard can be followed with the feature content or content page 88 being implemented by JSP (Java™ Server Page) technology, which is a well-known technique for dynamically building graphical user interfaces based on request 42 parameters with JSP pages that include a mixture of code and content that is recognized by browsers at the clients 50, 54, 58. In this embodiment, the feature content 88 is an individual JSP page that is part of the feature mechanism 26 and each feature mechanism 26 may have many feature content pages 88, with the flow among the feature content pages 88 controlled by the feature controller 80. Preferably, the technology used for providing the feature content 88 is selected to facilitate separating the business model or logic upon which the feature mechanism 26 is built from the presentation of the feature and its content to the user.

According to an important aspect of the invention, a presentation container 76 is provided as part of the portal framework 76 which generally functions to wrap a consistent presentation area or portion around presentation of the feature content 88 (as shown with two-way arrow and dashed lines in FIG. 2). In other words, the presentation container 76 assures a consistent "look and feel" for responses 44 provided from applications 24 accessed via the portal framework 22. The "look and feel" may be readily altered to suit a particular business or other application of the portal framework 22. For example, the presentation container 76 can act to display a desired masthead, section manager, page footer, breadcrumb, and content footer around the feature content 88 (e.g., provide the "hockey stick" presentation area) to allow the provider of the application 24 to maintain consistency while allowing changes to feature mechanism 26 and feature content 88. The presentation container 76 in a website application 24 is often a main website JSP or other page that includes a header, a menu, and a footer particular to the application 24 that is wrapped around or otherwise displayed integrally with the feature content 88.

Overall, the presentation container 76 functions to create the response 44 (such as a HTTP response) that is transmitted by the portal framework 22 back to the client 50, 54, 58. The presentation container 76 receives the processed user request 42 or select portions of the user request 42 from the abstract controller 72 (such as reference to the appropriate abstract model interface 74). The presentation container 76 then functions to retrieve display properties from the referenced abstract model interface 74. The presentation container 76 then builds the response 44 (e.g., page) with the properties and by loading or integrating the feature content 88. Prior to transmitting the response 44, the presentation container 76 may perform additional functions to improve the response 44. For example, the presentation container 76 may perform page level error handling, set page style sheet definitions, and check the user authorization.

To more fully explain the unique features of the invention, the operation of the service portal system 10 will be discussed with reference to FIGS. 1–3 highlighting the important functions of the portal framework 22 and its interaction and control over the application 24 and feature mechanisms 26 that together facilitate the development or building of applications and their features. The operation will be described as supporting an application 24 that is web-based, e.g., a website, as the portal framework 22 is especially well-suited for developing web-based applications but not as a limitation. Additionally, the following discussion may use terms and provide examples that are useful with in the Java™ programming environment, but it will be understood that the concepts of the invention are readily adapted to those skilled in the art to other programming and web server environments.

Figure 3:
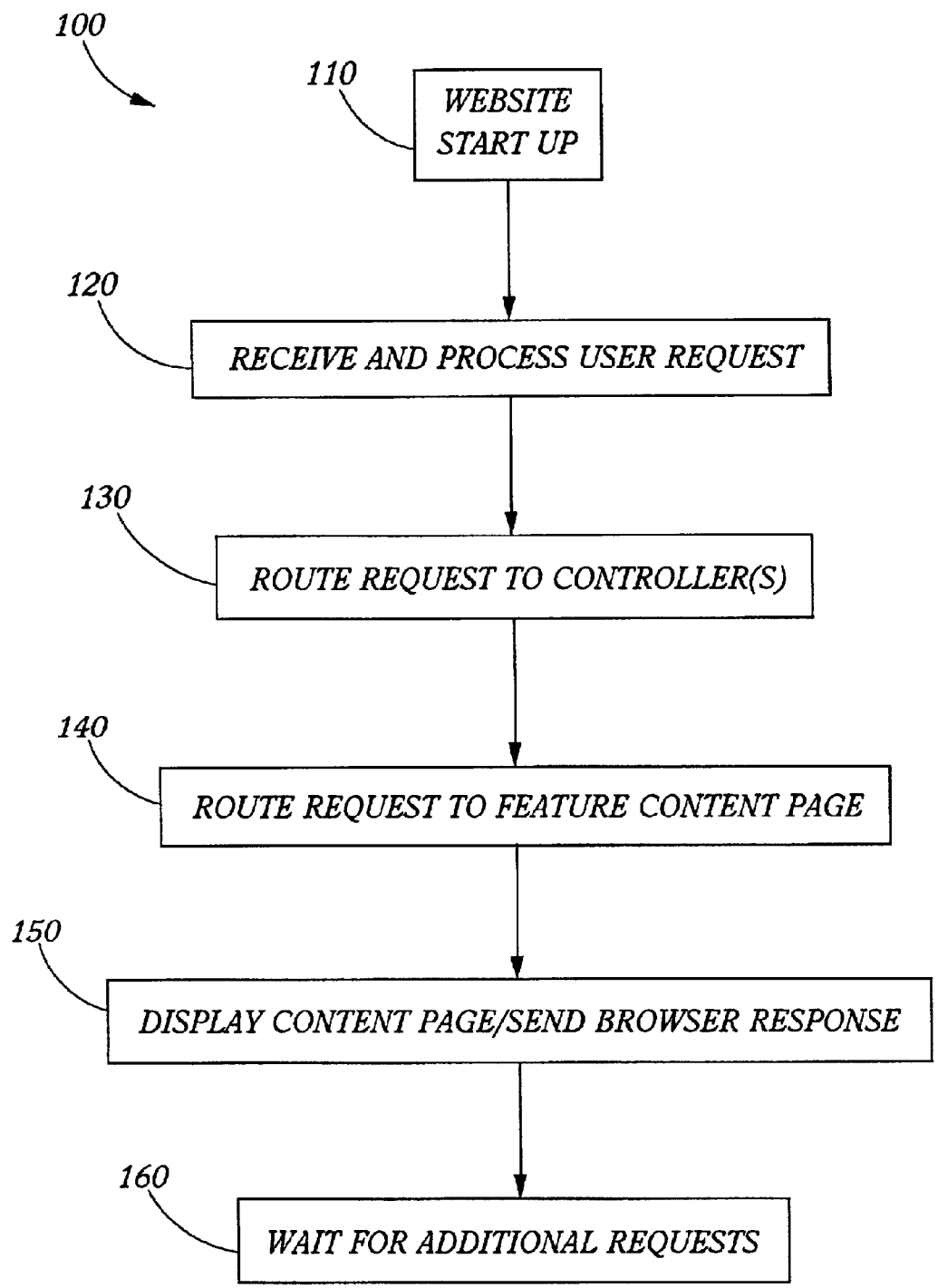
FIG. 3 is a flow diagram showing exemplary operation of the portal framework of the service portal system of FIG. 1.

FIG. 3 illustrates very generally the process 100 provided by the portal framework 22 during operation of the application server 20 of network 10. At 110, the application server 20 (and similarly server 30) is started up and the portal framework 22 acts to populate the cache memory 29 and initialize the website application 24 with the cached objects or data. At 110, the name of the application 24 is obtained from the service data 28 (e.g., from constants). The portal framework 22 operates automatically to cache any application 24 specific data including key value pair information (e.g., attributes), listings of feature mechanisms (e.g., application features), menus, collections of feature content pages 88, localization data (such as countries, states, languages, and the like), and any other application-scoped data from the service data 28 or other memory (not shown). The application 24 is then created or run on the application server 20 using the cached information.

At 120, the portal framework 22 receives a user request 42 from a client 50, 54, 58 over the network 40. A user request may occur whenever a user navigates, e.g., with a mouse via a browser at client 50, 54, 58, to a menu item or page function, and typically, the user requests are HTTP requests. In some embodiments, the portal framework 22 is configured to display a home page for the master controller 70 to the client 50, 54, 58 after a user navigates to the application 24 but prior to making a user request 42. In this case, the master controller 70 recognizes that an identifier for a particular feature content page 88 (i.e., a page name parameter) has not been supplied by the user. The master controller 70 then sets the page name parameter to the home page and retrieves a default or home feature content from the cache memory 29 along with a generic or home page controller and model interface. The presentation container 76 then builds a graphic display that is provided in the response 44.

At 120, the user request 120 is processed by the master controller 70 to obtain the page name parameter from other provided request information (if null, the page name parameter remains the home page). Next, the master controller 70 acts to get the feature content page 88 associated with the obtained page name parameter or to throw an exception if such a page 88 does not exist.

At 130, the user request 42 is routed to the feature controller 80. This involves the master controller 70 acting to instantiate or dynamically create the feature controller 80 using a controller identifier or name found in the retrieved feature content page 88. The feature content page 88 may then be stored in the created feature controller 80. Control of the process 100 is then passed to the feature controller 80 (such as by calling an initialize method). Steps 120 and 130 typically occur in response to a user of a client 50, 54, 58 operating their browser to navigate to a menu item or page function and the master controller 70 and abstract controller 72 handling the request 42 based on feature content 88 properties.

At 140, the request 42 is routed to the appropriate feature content page 88. Once the feature controller 80 gains control of the process 100, it processes form data and/or determines where next to navigate the request 42. The feature controller 80 also sets up a state(s) for the feature model interface 84. The feature controller 80 invokes behavior within the abstract controller 72 of the portal framework 22 to cause the abstract controller 72 to create the feature model interface 84. Significantly, the feature model interface 84 and feature controller 80 are separated in this fashion to allow separate modification and development of each component in the feature mechanism 26.

The abstract controller 72 then sets a reference to the feature model interface 84 in the processed and routed request 42 (to be picked up later by the feature content 88 or feature JSP). The abstract controller 72 can create a display menu (or other desired, but optional, look and feel elements of a view) and sets a reference to the feature content 88 in the feature model interface 84. The feature controller 80 can then perform routing decisions and set up the feature model interface 84 for the specific requested page. The feature controller 80 then causes the abstract controller 72 to forward the processed request 42 to the presentation container 76.

At 150, portal framework 22 functions to send the HTTP response 44 to display the feature content page 88 to the requesting user. In this regard, the presentation container 76 (e.g., the main website JSP) retrieves the reference to the abstract model interface 74 from the forwarded request 42 from the abstract controller 72. The presentation container 76 begins to build the response 44 by including at least a first part of the repeated "wrap around" presentation. In one embodiment, the first part of the wrap around presentation includes a page header and a menu (e.g., a page header JSP and a menu JSP from cache memory 29). The menu JSP typically will operate to get a display version of the menu from the abstract model interface 74 to show the location of the feature content 88.

The presentation container 76 then retrieves the location of the feature content page 88 from the abstract model interface 74. At this point, the presentation container 76 may verify whether the user is logged on and/or an authorized user of the application 24 prior to continuing the process 100. The presentation container 76 then continues building the response 44 by including the determined feature content 88 and a second part of the wrap around presentation (e.g., a content page header JSP, a content page footer JSP, and/or a page footer JSP from the cache memory 29). The built response 44 is then returned and the presentation displayed to the user. At 160, the portal framework 22 continues to operate by waiting for additional requests 42 from the same or different ones of the clients 50, 54, 58.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method in a computer system for providing a single access point to an application, comprising:
   receiving, over a communication network from a client machine, an application request at a portal framework;
   determining a requested feature content mechanism using the application request from a plurality of feature content mechanisms;
   routing at least a portion of the application request to the requested feature content mechanism;
   building a response with the requested feature content mechanism based on the routed portion of the application request and having an application content portion;
   modifying the response by integrating a reusable presentation container portion with the application content portion; and
   transmitting the modified response from the portal framework over the communication network to the client machine.

2. The method of claim 1, further including with the portal framework retrieving and storing data specific to the application and a listing of the feature content mechanisms in cache memory and initializing the application based on the application-specific data.

3. The method of claim 1, further including prior to the routing to the requested feature content mechanism, routing at least a portion of the application request to a feature controller previously created by the portal framework based on a controller identifier retrieved from the requested feature content mechanism.

4. The method of claim 3, further including creating a feature model interface with the portal framework based on a message from the feature controller, wherein the feature content page retrieves display properties from the feature model interface prior to the building.

5. The method of claim 4, wherein the feature model interface retrieves the display properties from a business model mechanism defining business rules.

6. The method of claim 4, further including prior to the building, retrieving with the feature model interface service data specific to the application request.

7. The method of claim 4, wherein the building is performed using Java™ Server Pages.

8. The method of claim 1, wherein the reusable presentation portion includes a header, a menu, and a footer.

9. The method of claim 1, further including verifying a user authorized to access the application is logged in at the client machine.

10. The method of claim 1, further including verifying the application request was sent by a user authorized to access the requested feature of the service.

11. The method of claim 1, further comprising providing a connection pool including a set of connections to service data for inclusion in the modified response, operating a data access layer for managing the set of connections, and with an interface to the data access layer and a business model providing populated objects based on business rules.

12. A computer system for managing operation of an application to provide a service to users and to facilitate feature development for the application, comprising:
   a service application including feature mechanisms for providing functions of the service, wherein each of the feature mechanisms includes a model interface portion, a view portion, and a controller portion;
   a memory device storing data related to the application; and
   a portal framework linked to a communication network and adapted for receiving from a client over the communication network a user request and for transmitting a response to the client, wherein the portal framework is further configured to process the user request to determine a requested one of the feature mechanisms, to route the user request to the requested feature mechanism, and to build the response with the view portion of the identified feature mechanisms using the application data in the memory device.

13. The computer system of claim 12, wherein each of the feature mechanisms can be replaced without modification of other ones of the feature mechanisms and the portal framework.

14. The computer system of claim 12, wherein the controller portion comprises a feature controller and the model interface comprises a feature model interface with properties set by the feature controller.

15. The computer system of claim 14, wherein the view portion comprises a feature content page retrieved by the portal framework based on an identifier in the user request and having properties obtained from the feature model interface.

16. The computer system of claim 15, wherein feature content page is blocked from accessing the feature controller.

17. The computer system of claim 15, wherein the feature controller is blocked from accessing the response.

18. The computer system of claim 14, wherein the portal framework further includes a connection pool having a set of connections to the memory device and a data access layer for controlling use of the connections and wherein the feature model interface is adapted to interface with the data access layer to retrieve the application-related data as part of operating the view portion.

19. The computer system of claim 12, wherein the response comprises application content provided by the view portion and a presentation portion integrated with the application portion by the portal framework.

20. The computer system of claim 19, wherein the response is in HTTP form including Java™ Server Page segments from the portal framework and the view portion.

* * * * *